United States Patent [19]

Baker

[11] 4,329,403
[45] May 11, 1982

[54] ELECTROLYTE-ELECTRODE ASSEMBLY FOR FUEL CELLS

[75] Inventor: Bernard S. Baker, Brookfield Center, Conn.

[73] Assignee: Energy Research Corporation, Danbury, Conn.

[21] Appl. No.: 257,740

[22] Filed: Apr. 27, 1981

[51] Int. Cl.³ .................................. H01M 8/14
[52] U.S. Cl. .............................. 429/35; 429/16; 429/46
[58] Field of Search ............ 429/35, 33, 34, 41, 429/44, 16, 112, 46

[56] References Cited

U.S. PATENT DOCUMENTS 3,268,365  8/1966  McQuade et al. ............ 429/16
3,404,038  10/1968  Winsel ........................... 429/35

*Primary Examiner*—Anthony Skapars

[57] ABSTRACT

An electrolyte-electrode assembly for high temperature fuel cells in which the electrolyte member is adapted to exhibit a more gradual transition in coefficient of thermal expansion in going from the anode electrode to the inner electrolyte region and in going from the cathode electrode to such inner electrolyte region.

20 Claims, 1 Drawing Figure

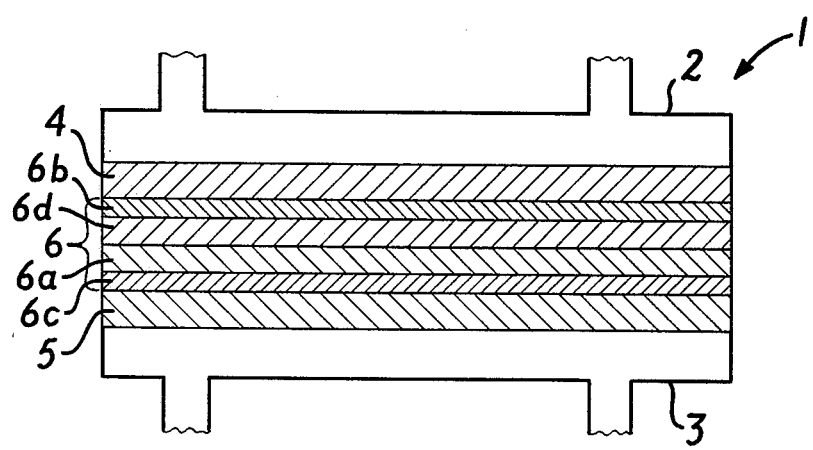

ELECTROLYTE-ELECTRODE ASSEMBLY FOR FUEL CELLS

BACKGROUND OF THE INVENTION

This invention pertains to high temperature fuel cells and, in particular, to electrode-electrolyte assemblies for use in such cells.

Higher temperature fuel cells such as, for example, molten carbonate cells, have the capability of producing electric power from coal at system efficiencies approaching 50 percent. These cells are thus an attractive candidate for alternative power sources which conserve energy.

In the development of high temperature fuel cells to date, it is customary to form the high temperature cells from discrete cathode and anode electrodes which sandwich a discrete electrolyte tile. The electrolyte-electrode assembly is then itself sandwiched between cathode and anode gas housings to complete the cell. It is also customary in this type of cell to add to the electrolyte tile a binder or filler material to provide a mechanism for preventing gas cross-over.

With the electrolyte-electrode assembly constructed in the above manner, it is found that the fuel cell exhibits a certain degree of contact resistance due to the lack of good contact over substantially the entire areas of the stacked components. IR losses also occur due to the necessary thickness of the electrolyte tile. Limited fuel cell bubble pressure is also evidenced, owing to the limited amounts of filler which can be added to the tile. Finally, there is a tendency of the tile to crack during thermal cycling. This cracking allows mixing of anode and cathode gases (gas cross-over) which results in cell failure.

While the aforesaid cracking of the electrolyte tile is not fully understood, it is generally believed to be due, at least in part, to the rather different coefficients of thermal expansion of the tile and electrodes. These differences and their effects are further aggravated, by the discrete layer arrangement of the assembly.

It is an object of the present invention to provide an electrolyte electrode assembly for realizing an improved high temperature fuel cell.

It is a further object of the present invention to provide an electrolyte-electrode assembly for realizing a high temperature fuel cell with increased power output and efficiency.

It is yet a further object of the present invention to provide an electrode-electrolyte assembly with increased resistance to cracking under thermal cycling.

It is also an object of the present invention to provide an electrolyte-electrode assembly having increased bubble pressure and reduced IR losses.

SUMMARY OF THE INVENTION

In accordance with the principles of the present invention, the above and other objects are realized in an electrolyte-electrode assembly comprising an electrolyte member disposed between anode and cathode electrodes, the electrolyte member being adapted to have a first coefficient of thermal expansion in an interior or inner region thereof and second and third coefficients of thermal expansion in regions thereof on opposite sides of the inner region and facing the anode and cathode electrodes, respectively, the second coefficient of thermal expansion being between the first coefficient of thermal expansion and the coefficient of thermal expansion of the anode electrode and the third coefficient of thermal expansion being between the first coefficient of thermal expansion and the coefficient of thermal expansion of the cathode electrode. Preferably, the inner region is formed as a layer and contains electrolyte material. The other two regions are also preferably layers and, if immediately adjacent the respective anode and cathode, contain respective anode and cathode material and electrolyte material.

With this type of construction for the electrolyte-electrode assembly, there is a more gradual transition in the coefficient of thermal expansion between each electrode and the electrolyte member. In the preferred case mentioned above, this gradual transition is due to the gradual change in element composition. It results in better contact between the electrodes and the electrode member and affords the member a greater resistance to cracking during thermal cycling. Overall improved performance is thus to be expected.

In further aspect of the invention, a layer of the electrolyte member between the inner layer and one of the electrodes is provided with filler in an amount sufficient to aid the assembly in preventing gas cross-over, i.e., aids in maintaining the assembly bubble pressure. This further enhances fuel cell performance. Also, the inner layer can be made thinner reducing IR losses and adding further to performance.

BRIEF DESCRIPTION OF THE DRAWINGS

The above and other features and aspects of the present invention will become more apparent upon reading the following detailed description in conjunction with the accompanying sole drawing which shows in a schematic fashion a fuel cell incorporating an electrolyte electrode assembly in accordance with the principles of the present invention.

DETAILED DESCRIPTION

In the FIGURE, high temperature fuel cell 1 includes input manifolds or housings 2 and 3 for coupling fuel process gas and oxidant process gas to anode and cathode electrodes 4 and 5, respectively. Disposed between these electrodes is an electrolyte member 6 including an inner or interior electrolyte containing region in the form of layer 6a. Typically, the high temperature fuel cell 1 might be a molten carbonate cell in which the anode electrode comprises a porous nickel material, the cathode electrode a porous nickel oxide material and the inner electrolyte layer a mixture of an alkali-carbonate and a filler or binder material for enhancing the bubble pressure of the layer. Typical alkali-carbonates might be potassium carbonate and lithium carbonate, while a typical filler or binder might be, for example, lithium aluminate.

In accordance with the invention, the electrolyte member 6 is further constructed so as to exhibit improved contact resistance and improved resistance to cracking during thermal cycling. More particularly, the electrolyte member 6 is formed so as to have more gradual transistion in thermal coefficient of expansion when proceeding from each of the electrodes 4 and 5 to the inner region 6a. In the present illustrative case, this is achieved by disposition of a first anode adjacent region in the form of a layer 6b between the anode electrode 4 and inner layer 6a, this layer 6b having a coefficient of thermal expansion between the coefficients of thermal expansion of the anode electrode 4 and the inner layer 6a. Similarly, a first cathode adjacent region in the form of a layer 6c is disposed between the layer 6a and the cathode electrode 5. This layer 6c is formed to have a coefficient of thermal expansion which is between the coefficients of thermal expansion of the cathode electrode 5 and the inner layer 6a.

The desired coefficients of thermal expansion for the anode and cathode adjacent layers 6b and 6c can be obtained by forming the layer 6b from the anode electrode material and the material of the inner layer in suitable proportion. Similarly, the layer 6c may comprise suitable proportions of the cathode electrode material and the inner layer material. For the case of nickel and nickel oxide anode and cathode electrodes 4 and 5 and an alkali-carbonate-filler electrolyte layer 6a, the layer 6b might comprise nickel and the alkali-carbonate-filler electrolyte material and the layer 6c might comprise nickel oxide plus such electrolyte material.

In accordance with a further aspect of the invention, one of the layers 6b and 6c is further formed to fortify the bubble pressure capability of the electrolyte member 6. Thus in the present illustrative case, the layer 6b is provided with a filler concentration increased over that of the layer 6a and such that the anode electrode material of the layer is filled with the filler material. The layer 6b thereby is made to possess a high bubble pressure which, in turn, aids the bubble pressure already provided to the member by the layer 6a.

In the present illustrative case, a further layer 6d is disposed between the high-bubble pressure layer 6b and the inner layer 6a to further ensure gradual transistion in thermal coefficients between these layers. This further layer is formed from a mixture of alkali-carbonate and filler, the alkali-carbonate content being richer in this layer than the layer 6b and such that the layer exhibits a coefficient of thermal expansion between those of the layers 6b and 6a.

As can be appreciated, the number of additional layers situated between each electrode and the inner electrolyte layer 6a to form the electrolyte member 6 will depend upon the degree of gradual transition in thermal coefficient desired. This, in turn, will depend upon each particular application and the performance characteristics attendant such application. In general, however, each added layer preferably should have a material content which results in a thermal coefficient of expansion which is at least between those exhibited by its respective immediately preceding and suceeding layers.

Construction of the electrolyte member in accordance with the invention has the added advantage of enabling the predominant electrolyte layers 6a and 6d, as well as the other electrolye layers 6b and 6c, to be extremely thin. Thus, a total thickness for the layers 6a and 6d as low as about 10 mils is possible, as compared to a lower thickness of about 70 mils in prior structures. This ability to obtain thin layers enhances electrolyte conductivity as well as reduces thermal dimensional changes. Greater power output and greater fuel cell efficiency can therefore be realized with simultaneous realization of a more stable electrolyte member.

A typical fuel cell constructed in accordance with the invention might be as follows. The anode 3 might comprise a porous nickel material of mean pore size of 2-12 microns upon whose surface is impregnated lithium aluminate of particle size of 0.01 to 0.1 micrometers and concentration from 2 to 30 volume percent, this impregnated layer then be filled with an alkali-carbonate in concentration 20 to 60 weight percent based on the total weight of alkali carbonate plus lithium aluminate to form the layer 6b. In such case, the total thickness of the anode 3 and the layer 6b might be 5-40 mils. The layers 6d and 6a might comprise a mixture of lithium aluminate and alkali-carbonate in respective concentrations of 30 to 70 weight percent for the layer 6d and of 20 to 60 weight percent alkali carbonate for the layer 6a. The total thickness of these two layers might be in the range of 5-20 mils. Finally, the cathode electrode 5 might comprise nickel oxide having a mean pore size of 3-20 microns, with the layer 6c being formed on the surface of the electrode by deposition of the alkali carbonate-lithium aluminate electrolyte composition of layer 6a. These two elements, 6c and 5, might have a total thickness of 5-40 mils.

Formation of the electrodes 4 and 5 and the electrolyte member may be accomplished using various techniques such as, for example, spraying, electrophoretic deposition and/or filtration to obtain a thin layered composite laminate. A particular process for producing the assembly of the FIGURE would be to utilize a filtration and melting process as follows. A porous anode electrode 4 is placed into a filtering apparatus which is provided with a slurry of lithium aluminate in a suitable working fluid. The slurry is filtered under suction through the electrode structure to produce a thin aluminate layer for formation of the layer 6b and a further layer for formation of the layer 6d. Then, a controlled volume of alkali-carbonate is placed on the outmost lithium aluminate layer so that on raising the composite structure above the melting point of the electrolyte under a $CO_2$ containing non-oxidizing atmosphere, the electrolyte melts and flows into the two lithium aluminate layers filling them and rendering them non-porous, whereby the formation of the layers 6b and 6d is brought to completion. Electrolyte is prevented from flowing into the body of the electrode 4 by the high bubble pressure layer 6b, which results from the fine lithium aluminate particles of the layer entering the pores of the nickel electrode. The layer 6a, in turn, is formed by either filtration or electrophoretic deposition. The remainder of the assembly i.e., the layer 6c is produced by a similar filtration and melting process in the appropriate concentration of lithium aluminate and alkali-carbonate on a porous nickel oxide electrode. The two assemblies are then sandwiched together to form the composite structure.

It would be equally feasible to start the process of building up layers beginning with cathode. In this case either a porous nickel or porous nickel oxide structure would be the starting cathode electrode. If nickel were used it would be converted to nickel oxide in the fuel cell during start up.

In all cases, it is understood that the above-described arrangements are merely illustrative of the many possible specific embodiments which represent applications of the present invention. Numerous and varied other arrangements can readily be devised in accordance with the principles of the present invention without departing from the spirit and scope of the invention. Thus, another configuration of layered electrolyte member 6 might be to include two layers between each electrode and the inner electrolyte layer 6a. The layer closest the respective electrode might comprise the electrode material into which has been imparted a concentration of the alkali-carbonate material and the layer closest the inner electrolyte layer might comprise alkali-carbonate material of higher concentration than the electrode closest layer and electrode material in lesser concentration than such electrode closest layer.

What I claim is:

1. An electrolyte-electrode assembly for use in a high-temperature fuel cell comprising:
an anode electrode comprised of a first material;
a cathode electrode comprised of a second material;
an electrolyte member situated between said anode and cathode electrodes and having an inner region and first and second regions on opposite sides of said inner region facing said anode and cathode electrodes, respectively, said first region having a thermal coefficient of expansion between the coefficients of thermal expansion of said anode electrode and said inner region and said second region having a coefficient of thermal expansion between the coefficients of thermal expansion of said cathode electrode and said inner region.

2. An assembly in accordance with claim 1 wherein:
said first material is a metal;
said second material is one of a metal and metal oxide.

3. An assembly in accordance with claim 1 or 2 wherein:
said inner region and said first and second regions each comprise a layer.

4. An assembly in accordance with claim 1 or 2 wherein:
said inner region includes an alkali-carbonate electrolyte material.

5. An assembly in accordance with claim 4 wherein:
said inner region is non-conductive.

6. An assembly in accordance with claim 4 wherein:
said inner region further includes a first filler material for inhibiting gas cross-over.

7. An assembly in accordance with claim 4 wherein:
one of said first and second regions includes a second filler material for inhibiting gas cross-over.

8. An assembly in accordance with claim 7 wherein:
said first filler material and said second filler material are substantially the same.

9. An assembly in accordance with claim 8 wherein:
said first and second filler materials are each comprised of lithium aluminate.

10. An assembly in accordance with claim 4 wherein:
said first region includes said first material and said alkali-carbonate electrolyte;
and said second region includes said second material and said alkali-carbonate electrolyte.

11. An assembly in accordance with claim 10 wherein:
said inner region includes a filler material;
and one of said first and second regions includes said filler material.

12. An assembly in accordance with claim 11 wherein:
said first and second regions each include said filler material.

13. An assembly in accordance with claim 11 wherein:
said filler material concentration of said one of said first and second regions is higher than the filler material concentration of said inner region.

14. An assembly in accordance with claim 13 further comprising:
a third region between said one of said first and second regions and said inner region, said third region having a coefficient of thermal expansion between the coefficients of thermal expansion of said one region and said inner region and including said filler material of said one region said alkali-carbonate material, said filler material in said third region being in concentration between the concentration of filler material in said one and inner regions.

15. An assembly in accordance with claim 14 wherein:
said one region is said first region.

16. An assembly in accordance with claims 12 wherein:
said first material is nickel;
and said second material is nickel oxide.

17. An assembly in accordance with claim 16 wherein:
said filler material is lithium aluminate.

18. An assembly in accordance with claim 17 wherein:
the total thickness of said regions containing said first material is between 5-40 mils;
the total thickness of said regions containing said second material is between 5-40 mils;
and the total thickness of the remaining regions is between 5-20 mils.

19. An assembly in accordance with claim 1 further comprising:
a first set of one or more regions disposed between said first region and said anode electrode, the one of said regions of said first set closest to said anode electrode having a coefficient of thermal expansion which is between the coefficients of thermal expansion of the immediately preceding region and said anode electrode and each remaining region of said first set having a coefficient of thermal expansion which is between the coefficients of thermal expansion of the immediately preceding and immediately succeeding regions.

20. An assembly in accordance with claim 1 or 19 further comprising:
a second set of one or more regions disposed between said second region and said cathode electrode, the one of said regions of said second set closest said cathode electrode having a coefficient of thermal expansion which is between the coefficients of thermal expansion of the immediately preceding region and said cathode electrode and each of said remaining regions of said second set having a coefficient of thermal expansion between the coefficients of thermal expansion of the immediately preceding and succeeding regions.

* * * * *